US012811464B2

(12) United States Patent
Walisko et al.

(10) Patent No.: US 12,811,464 B2
(45) Date of Patent: Nov. 24, 2026

(54) ASSEMBLY FOR ESTABLISHING ELECTRICAL CONTACT WITH AN ELECTRIC MOTOR FOR DRIVING A REFRIGERANT COMPRESSOR, ELECTRIC MOTOR FOR DRIVING A REFRIGERANT COMPRESSOR, AND METHOD FOR ESTABLISHING ELECTRICAL CONTACT WITH THE ELECTRIC MOTOR

(71) Applicant: Hanon Systems, Daejeon (KR)

(72) Inventors: David Walisko, Hürth (DE); Jürgen Wawer, Mechernich (DE); Florian Semmler, Cologne (DE)

(73) Assignee: HANON SYSTEMS, Daejeon (KR)

( * ) Notice: Subject to any disclaimer, the term of this patent is extended or adjusted under 35 U.S.C. 154(b) by 558 days.

(21) Appl. No.: 18/349,457

(22) Filed: Jul. 10, 2023

(65) Prior Publication Data

US 2024/0014703 A1 Jan. 11, 2024

(30) Foreign Application Priority Data

Jul. 11, 2022 (DE) ..................... 10 2022 117 237.6
Jun. 26, 2023 (DE) ..................... 10 2023 116 758.8

(51) Int. Cl.
*H02K 3/52* (2006.01)
*H02K 3/50* (2006.01)
(Continued)

(52) U.S. Cl.
CPC ............... *H02K 5/225* (2013.01); *H02K 3/50* (2013.01); *H02K 3/52* (2013.01); *B60H 1/3226* (2013.01);
(Continued)

(58) Field of Classification Search
CPC .......... H02K 5/225; H02K 3/522; H02K 3/50; H02K 3/38; H02K 3/52; H02K 5/22;
(Continued)

(56) References Cited

U.S. PATENT DOCUMENTS

2020/0018300 A1* 1/2020 Guntermann ....... F04C 29/0085

FOREIGN PATENT DOCUMENTS

JP 2010011658 A * 1/2010 ............ H02K 15/32
JP 2012100492 A 5/2012
(Continued)

OTHER PUBLICATIONS

Kojima et al, Bus Bar Unit and Brushless Motor, Oct. 16, 2014, JP 2014197951 (English Machine Translation) (Year: 2014).*
(Continued)

*Primary Examiner* — Alexander A Singh
(74) *Attorney, Agent, or Firm* — Shumaker, Loop & Kendrick, LLP; James D. Miller

(57) ABSTRACT

An assembly for establishing electrical contact with an electric motor for driving a compressor which is formed in a motor vehicle air conditioning system for compressing a gaseous fluid. The assembly has an annular carrier element, wherein the annular carrier element on its side facing the stator has at least two axial spacer elements, which rest on an axial end face of the stator when the assembly is positioned on the stator, wherein the spacer elements are dimensioned in such a way that an air gap is formed between an underside of the annular carrier element and an axial end face of the stator. The invention also relates to a method for assembling the assembly, and an electric motor having such an assembly.

17 Claims, 3 Drawing Sheets

(51) Int. Cl.
*H02K 5/22* (2006.01)
*B60H 1/32* (2006.01)

(52) U.S. Cl.
CPC ...... *B60H 2001/3292* (2013.01); *H02K 3/522* (2013.01); *H02K 2203/09* (2013.01)

(58) Field of Classification Search
CPC ........... H02K 2203/09; B60H 1/00785; B60H 1/00842; B60H 3/024; B60H 1/3226; B60H 2003/028; B60H 2001/3292
USPC .......................................................... 310/71
See application file for complete search history.

(56) References Cited

FOREIGN PATENT DOCUMENTS

| | | | | | |
|---|---|---|---|---|---|
| JP | 2014019795 | A | | 2/2014 | |
| JP | 2014197951 | A | * | 10/2014 | ............ H02K 3/522 |
| JP | 6282506 | B2 | | 2/2018 | |
| JP | 2018528741 | A | | 9/2018 | |
| KR | 102227294 | B1 | | 4/2016 | |
| WO | WO-2016177536 | A1 | * | 11/2016 | ............ H02K 3/522 |
| WO | 2017138534 | A1 | | 8/2017 | |
| WO | 2019082410 | A1 | | 5/2019 | |
| WO | WO-2020013078 | A1 | * | 1/2020 | .............. H02K 3/50 |
| WO | 2021200053 | A1 | | 10/2021 | |

OTHER PUBLICATIONS

Schaflein et al, Stator for an Electrical Machine Having a Potted Interconnection Device, Nov. 10, 2016, WO 2016177536 (English Machine Translation) (Year: 2016).*
Ochiai Atsumi, Method of Insert Molding Terminal for Brushless Motor, Jan. 14, 2010, JP 2010011658 (English Machine Translation) ( Year: 2010).*
Ninomiya et al, Motor and Electric Power Steering Device, Jan. 16, 2020, WO 2020013078 (English Machine Translation) (Year: 2020).*

* cited by examiner

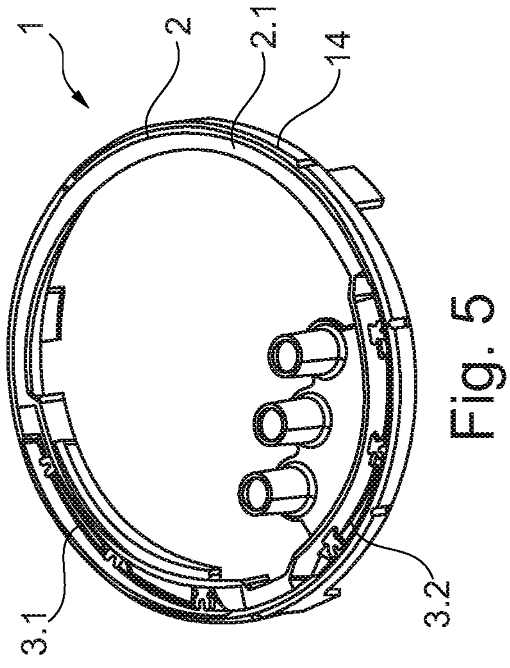
Fig. 5
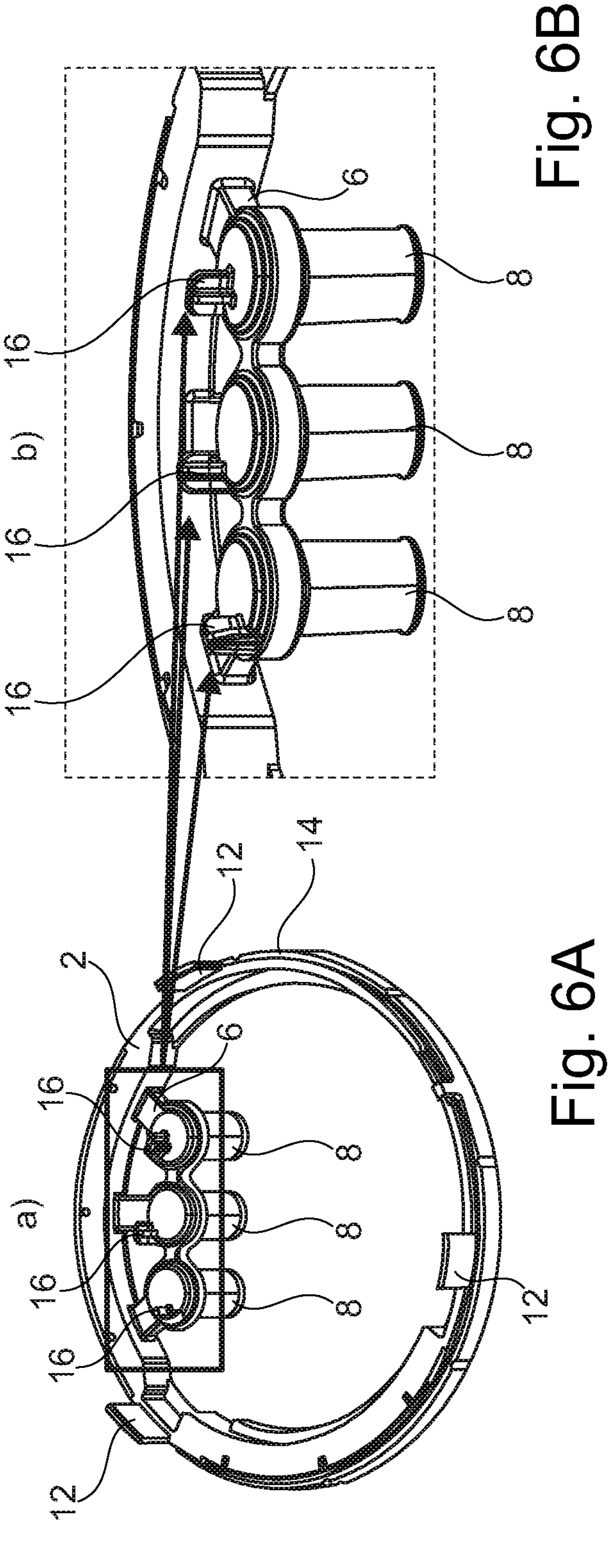
Fig. 6A
Fig. 6B

ASSEMBLY FOR ESTABLISHING ELECTRICAL CONTACT WITH AN ELECTRIC MOTOR FOR DRIVING A REFRIGERANT COMPRESSOR, ELECTRIC MOTOR FOR DRIVING A REFRIGERANT COMPRESSOR, AND METHOD FOR ESTABLISHING ELECTRICAL CONTACT WITH THE ELECTRIC MOTOR

CROSS REFERENCE TO RELATED PATENT APPLICATIONS

This is claims the benefit of and priority to German Patent Application No. 10 2023 116 758.8 filed on Jun. 26, 2023 and German Patent Application No. 10 2022 117 237.6 filed on Jul. 11, 2022, the entire contents of each of which are incorporated herein by reference.

FIELD

The invention relates to an assembly for establishing electrical contact with an electric motor for driving a compressor which is provided for compressing a gaseous fluid, specifically a refrigerant, in a refrigerant circuit of a vehicle air conditioning system. Furthermore, the invention relates to an electric motor with such an assembly for establishing electrical contact and a method for assembling the assembly for establishing electrical contact with an electric motor of a compressor as part of a vehicle air conditioning system for vehicle temperature control.

BACKGROUND

An electrically driven compressor, as used in vehicle air conditioning systems for temperature control of the vehicle, has an inverter for driving the electric motor in addition to the electric motor for driving the respective compression mechanism. The inverter is used to convert direct current from a vehicle battery into alternating current, which is fed to the electric motor through electrical connections. Electric motors of electrically driven compressors are usually formed with an annular stator core with coils disposed thereon, and a rotor, wherein the rotor is disposed inside the stator core. The rotor and the stator are oriented in this case on a common axis of symmetry or axis of rotation of the rotor. The inverter provided for providing alternating current has plug connections for plug connectors formed as separate components and pins for electrically connecting to or establishing electrical contact with connections of the electric motor, which in turn are electrically connected to connection conductors of lead wires of the coils of the stator. The electrical contact points of the electric motor are usually disposed on an end face of the stator that is oriented in the axial direction of the stator. In this case, these electrical connections or contact points can be formed within a connector housing. At the inverter, plug connectors formed as pins can be plugged into a connection port provided in a connector housing in each case during assembly of the compressor and contacted with a corresponding lead wire, in particular a connection lead of the lead wires, which emerge from the coils of the stator. In this case, an end piece of these lead wires is electrically and mechanically connected to the connection lead in such a way that a low contact resistance between the plug connector of the inverter and the lead wire is ensured in each case. In order to simultaneously ensure an electrical connection with high insulation resistance, for example between the connection conductors of the lead wires, uninsulated ends of the connection conductors of the lead wires, which emerge from the coils, also referred to as phase conductors, must be electrically insulated from each other and from other electrically conductive components of the stator and in particular from the motor housing. A hermetic seal is preferably provided for such electrical conductors.

A corresponding device with an assembly for establishing electrical contact of the electric motor with the inverter is known from the applicant's document DE 10 2019 107 523.8. The assembly described there for establishing electrical contact between the lead wires of the stator emerging from the coils and an inverter of the electric motor has a plug housing and a plug receptacle, which must first be plugged together during assembly. Furthermore, the ends of the phase conductors or the lead wires must be disposed and assembled within the plug housing before all exposed electrical conductors can be electrically insulated from one another with a potting material. The assembly of this assembly for establishing electrical contact is associated with a comparatively high expenditure of time, since the individual parts present must be assembled individually by hand or mechanically. Due to the number of assembly steps involved, there is also an increased potential for errors. Furthermore, the known solution requires comparatively long connections of the phase conductors between the coils and the plug receptacle due to the arrangement of the plug receptacle on the end face of the stator, which is associated with increased material costs.

SUMMARY

The object of the invention is now to eliminate the problems described in the prior art and to propose an assembly for establishing electrical contact with an electric motor for driving a compressor which is provided for compressing a gaseous fluid, specifically a refrigerant, in a refrigerant circuit of a vehicle air conditioning system. The assembly for establishing electrical contact should also have the smallest possible number of individual components and parts in order to also enable the simplest possible assembly and to reduce the weight and the space requirement. In this case, all connection conductors of the lead wires, in particular the ends of the connection conductors of the lead wires disposed within the assembly for establishing electrical contact, should be hermetically sealed from one another and from the surrounding electrically conductive components. It is a further object to propose an electric motor with such an assembly for establishing electrical contact, and a method for assembling the assembly for establishing electrical contact with the electric motor.

The object is achieved with an assembly as shown and described herein.

According to the conception of the invention, an assembly for establishing electrical contact with electric motor for driving a compressor is provided, which is formed in a motor vehicle air conditioning system for compressing a gaseous fluid, especially a refrigerant. The assembly is used for establishing electrical contact with an electric motor on the one hand and on the other hand forms an interface for connection with an electrical inverter for driving the electric motor.

The assembly according to the invention for establishing electrical contact with the electric motor of a compressor in a vehicle air conditioning system has first and second electrical conductor elements for the electrical connection of electrical connection conductors of lead wires of coils projecting axially from a stator of the electric motor on an axial end face. These electrical connection conductors of lead wires of coils, which project from an axial end face, can also be referred to as axially projecting connection conductors or axial connection conductors. The term connection conductor also comprises the line ends of the lead wires of coils, which also project axially from the stator at the axial end face for establishing electrical contact. Furthermore, the assembly according to the invention has an annular carrier element formed by injection molding, in which the electrical conductor elements are integrated and overmolded by the material of the annular carrier element. In this case, first electrical connection elements of the electrical conductor elements projecting in a radial direction from the annular carrier element are formed for establishing electrical contact with the electrical connection conductors of lead wires of the stator, which project axially from the end face, wherein a first electrical conductor element is formed as an electrical busbar and wherein a plurality of second electrical conductors have, electrically separated from one another, second electrical connection elements in the form of electrically conductive sockets. These electrically conductive sockets, which are open on one side for plugging in a pin-shaped plug element, are integrated in the annular carrier element, overmolded by the material of the annular carrier element on the outer circumference. While the first electrical conductor element is formed as an electrical busbar, in which a plurality of the first electrical connection elements are electrically connected with the first electrical conductor element, the second electrical conductor elements form the electrical connections between the first and second electrical connection elements of the second electrical conductor elements in order to establish an electrical connection between the conducting wires of the coils of the stator and an inverter for driving the electric motor when pin-shaped plug elements of the electrical inverter are plugged into the electrically conductive sockets. The first electrical connection elements of the electrical conductor elements can also be referred to as radial connection elements of the electrical conductor elements because of their radially outward arrangement. According to the invention, the annular carrier element has at least two, preferably three, axial spacer elements on its side facing the stator, which rest on an axial end face of the stator when the assembly is positioned on the stator, wherein with the spacer elements are dimensioned in such a way that an air gap is formed between an underside of the carrier element and an axial end face of the stator. This air gap also exists between the underside of the carrier element and the coils and insulator elements of the stator.

The spacer elements create a gap between the underside of the assembly and the stator and thus prevent the annular carrier element from being disposed too tightly on the stator or on stator components. The spacer elements are dimensioned in such a way that a distance or a gap, in particular an air gap, is ensured between the annular carrier element and components disposed radially on the inside of the stator, such as insulator elements, for example coils and their insulating overmolding, and stator teeth. The annular carrier element is supported on an axial end face of the stator by the spacer elements, so that there is no contact between the underside of the annular carrier element and the axial end face of the stator opposite the underside. The spacer elements can be in contact with a radial outside of the stator.

Since a 3-phase alternating current is usually provided by an inverter for driving an electric motor, the annular carrier element has, according to a preferred embodiment, three electrically conductive sockets and also three second electrical conductor elements, each with a radial first electrical connection element projecting radially from the annular carrier element, in order to establish electrical contact with the connection conductors of lead wires of the coils of the stator of the electric motor.

The component according to the invention simplifies the assembly process since fewer individual parts have to be combined with one another. Due to the reduced complexity of parts of the assembly according to the invention, the risk of error sources is reduced compared to the prior art. Furthermore, assembly on the stator is also simplified because the electrical connection or electrical contact is established directly where the connection conductors of the lead wires emerge from the coils of the stator in an axial direction from the stator. Since the electrical conductor elements integrated in the annular carrier element are already electrically insulated by the overmolded material of the annular carrier element, there is no need for additional core insulation sleeves and long laying routes from connection conductors of the lead wires to the connection area of the electrically conductive sockets for establishing electrical contact with the electrical inverter.

With regard to the arrangement of the electrical connection elements of the electrical conductor elements of the annular conductor element, various design concepts of the stator or of the electric motor can be implemented. The positions of the first electrical connection elements of the electrical conductor elements of the annular carrier element can be predetermined, for example. The specific position specification of the first electrical connection elements simplifies the assembly of the assembly for establishing electrical contact with the electric motor. This also advantageously reduces the line paths of the electrical connection conductors of the lead wires of the coils, since the arrangement of the first electrical connection elements of the electrical conductor elements of the annular carrier element enables direct electrical contact to be established with the connection conductors of the coils projecting from the stator in the axial direction.

The annular carrier element is preferably formed with a radial ring surface and an axial ring surface which are joined together in abutting relationship at outer side edges. The radial ring surface of the annular carrier element is advantageously in the form of an annulus, in particular a section of an annulus or an open annulus, and can be interrupted in sections by cavities or recesses, while the axial ring surface of the annular carrier element is in the form of an annular cylinder and can also be interrupted by cavities or recesses. The annular carrier element can thus have radial cavities, axial cavities or cavities in the form of recesses, wherein the first radial electrical connection elements are disposed radially outwards in the cavities and/or the recesses.

In areas of the annular carrier element in which radial cavities, axial cavities and/or cavities in the form of recesses are formed, guides or feed-throughs in the form of radial cut-outs and/or axial openings can be formed for the axial electrical connection conductors of the lead wires of the coils. The radial cut-outs and/or the axial openings for guiding or feeding through the electrical connection conductors of the lead wires projecting axially from the end face of the stator and the radial first electrical connection elements projecting radially from the annular carrier element are advantageously designed to correspond to one another. In other words, the positions of radial cut-outs and/or axial openings are oriented radially and axially to the positions of the radial first electrical connection elements of the electrical conductor elements, thus enabling axial guiding or feeding through the axial electrical connection conductors of the lead wires, which project axially from the end face from a stator. This ensures that the axial electrical connection conductors of the lead wires directly meet the electrical connection elements of the electrical conductor elements during assembly of the assembly.

The cavities or recesses, which can be formed in the radial ring surface and/or in the axial ring surface of the annular carrier element, serve as a space for receiving the potting material for establishing a hermetic seal and electrical insulation of the radial first electrical connection elements disposed in the cavities or recesses and the axial electrical connection conductors when they are connected with the radial first electrical connection elements in the assembled state.

According to one configuration of the assembly, axial cavities can be formed on an axial ring surface which is formed on the annular carrier element on the axial end face of the annular carrier element that faces away from the stator, which axial cavities are axially limited by an underside of the annular carrier element that is formed in an axial direction and facing the stator, wherein the radial first electrical connection elements of the first electrical conductor element are disposed in a first axial cavity, wherein the radial first electrical connection elements of the second electrical conductor elements are disposed in a second axial cavity. In this case, the radial cut-outs and/or the axial openings for guiding or passing through the axial electrical connection conductors of the lead wires are formed in the underside of the annular carrier element in such a way that the axial electrical connection conductors of the lead wires can be introduced into the axial cavities from the underside of the annular carrier element. The axial cavities are preferably formed within a radial annular section. The axial cavities are thus each formed as a partial area of the axial ring surface of the annular carrier element and are delimited by the underside of the annular carrier element and by the radial inside and the radial outside of the annular carrier element.

According to a further configuration of the assembly, the cavities can be formed as radial cavities on a ring surface of the annular carrier element which is oriented radially outwards, wherein the radial cavities are delimited axially by an underside of the annular carrier element which is formed in an axial direction and which faces the stator, and by the upper side of the annular carrier element. The radial cavities are thus open radially for filling with a potting material. In this case, the radial first electrical connection elements of the first electrical conductor element are disposed in a first radial cavity, wherein the radial first electrical connection elements of the second electrical conductor elements are disposed in a second radial cavity. The radial cut-outs and/or the axial openings, which serve to guide or feed through the electrical connection conductors of the lead wires projecting axially from the end face of the stator, are also formed in the underside of the annular carrier element in this configuration. The radial cavities are preferably formed within a radial annular section. The radial cavities are thus formed along the radial circumference of the annular carrier element in each case as a partial area of the radial ring surface of the carrier element in such a way that the ring surface that is oriented radially outwards is interrupted. The first electrical connection elements of the electrical conductor elements are preferably disposed within the cavities in such a way that they do not project beyond the outer radial circumference of the annular carrier element.

The shape and dimensioning of the recesses in which the radial first electrical connection elements of the electrical conductor elements are disposed can, like the radial or axial cavities, be predetermined by the injection mold for producing the annular carrier element. In this case, the recesses are designed in such a way that they are delimited by the underside of the annular carrier element facing the stator and by the material of the annular carrier element on the radial inner circumference. In this configuration, too, the first electrical connection elements are disposed within the recesses pointing radially outwards. A first recess can be provided for the radial first electrical connection elements of the first electrical conductor element, with the radial first electrical connection elements of the second electrical conductor elements being disposed in a second recess. The recesses can be offset by a predetermined angle. To delimit the recesses of the annular carrier element on the radial outer circumference, the assembly can have a stop ring, which is disposed on the radial circumference of the annular carrier element. The stop ring delimits the recesses radially outwards in such a way that the recesses are open only towards the axial upper side of the annular carrier element. The recesses can be filled with a potting material from the upper side of the annular carrier element. In this case, the stop ring has latching elements in order to fix a position on the annular carrier element. Furthermore, the stop ring can have a thread in order to screw it onto the annular carrier element, with the locking elements locking in a threaded end position in order to fix the stop ring in place.

The stop ring can have shutters pointing radially inwards, which correspond to the guides or feed-throughs formed as radial cut-outs and/or axial openings for the axial connection conductors of the lead wires in such a way that the radial cut-outs and/or axial openings can be covered at least area by area when the stop ring is positioned on the annular carrier element. The shutters reduce the opening cross section of the radial cut-outs and/or the axial openings in such a way that when the recesses are filled with a potting material, the risk of the potting material escaping through the radial cut-outs and/or the axial openings is reduced.

The radial first electrical connection elements of the electrical conductor elements can have open or closed eyelets for receiving the electrical connection conductors of the lead wires. Advantageously, when the assembly is assembled on the stator, the axial electrical connection conductors of the lead wires are guided directly from the radial cut-outs and/or axial openings into the eyelets of the radial first electrical connection elements, so that particularly simple assembly and electrical connection of the axial electrical connection conductors of the lead wires is ensured, whereby the number of assembly steps can be reduced.

To further stabilize the guiding of axial electrical connection conductors and axial electrical lead ends of the lead wires of coils of the stator, guide elements can be disposed in the recesses, which are formed to point radially outwards from the radially indented recess walls, from which the radial first electrical connection elements project. A guide element is associated with each radial first electrical connection element, with the guide elements being disposed at an angle with respect to the radial first electrical connection elements. In this case, each guide element has an inclined side which faces a radial cut-out. The guide elements are provided to axially support the axial electrical connection conductors inserted through the radial cut-outs and the axial electrical lead ends of the lead wires of coils of the stator, in order to ensure that they are received in the half-open eyelets of the first radial electrical connection elements.

According to a further advantageous configuration of the assembly according to the invention, it can be provided that a radially inwards extending radial projection is formed on the annular carrier element, by which the second electrical connection elements of the second electrical conductor elements are received in the form of electrically conductive sockets that are overmolded on the outer circumference, wherein the electrically conductive sockets that are overmolded on the outer circumference extend in the axial direction out of the radial projection on an upper side facing away from the stator. The arrangement of the electrically conductive sockets that are overmolded on the outer circumference is preferably formed in such a way that the electrically conductive sockets that are overmolded on the outer circumference, project perpendicular from an axial end plane of the annular carrier element in order to enable connection of a plug element of an electrical inverter. As a result, the electrically conductive sockets that are overmolded on the outer circumference can form a plug receptacle for a plug element of an electrical inverter. This plug receptacle can be formed axially on the upper side of the annular carrier element leading away from the stator.

The projection that extends radially inwards on the annular carrier element is substantially formed from the overmolding of the second electrical conductor elements and the second electrical connection elements in order to electrically insulate the second electrical conductor elements and to enable establishment of electrical contacts for the plug element of the inverter radially on the inside away from the outer circumference of the annular carrier element for better use of space.

The electrically conductive sockets that are overmolded on the outer circumference which are a shaped configuration of the second electrical connection elements of the second electrical conductor elements, can be disposed at equal intervals on a secant intersecting the annular carrier element. This secant runs through the radially inwards extending projection, which means that the electrically conductive sockets that are overmolded on the outer circumference are disposed on a common line at equal distances at the radially inwards extending projection. Consequently, the second electrical conductor elements, which are integrated in the annular carrier element, can have different lengths if the radial first electrical connection elements of the second electrical conductor elements project radially at a radial circular arc section of the annular carrier element.

Axially projecting supporting elements can be formed from the material of the annular carrier element on an underside of the annular carrier element facing the stator in the area of the radial projection. In each case one carrier element can be associated with an electrically conductive socket that is overmolded on the outer circumference, wherein the supporting element is formed on an underside of the overmolding of the electrically conductive socket axially in the direction of the stator. The supporting elements are provided to support the radial projection of the annular carrier element in the event of an axial compressive load against the stator, in particular against a stator core, wherein the supporting elements are dimensioned in such a way that a predetermined expansion distance is maintained between the supporting elements and the stator. The supporting elements are provided in order to avoid axial overstretching when an axial compressive force is exerted on the radially inwards pointing projection during assembly of a plug connector of an electrical inverter. The expansion distance is advantageously dimensioned in such a way that a sufficiently large gap remains between the underside of the supporting elements and the stator in order to avoid contact between the supporting elements and the stator during operation of the electric motor. The dimensioning of the supporting elements is therefore chosen in such a way so as to ensure support in order to protect against axial overexpansion and that an expansion distance in the form of an air gap remains when no axial compressive force is exerted on the annular carrier element, in particular on the inwards directed radial projection of the annular carrier element. The supporting elements, which are formed as part of the annular carrier element in the injection molding process, thus fulfill their function during assembly of the plug connector, wherein an axial compressive force is exerted on the area of the radial projection.

The annular carrier element can be formed from a plastic, specifically from polyamide 66 (PA66) material.

The invention further comprises a method for producing an assembly for establishing electrical contact with an electric motor for driving a compressor which is formed in a motor vehicle air conditioning system for compressing a gaseous fluid. In the method, a first and a plurality of second electrical conductor elements, preferably exactly three second electrical conductor elements, and electrically conductive sockets are placed in an injection mold that defines the shape of the annular carrier element and then a plastic material, preferably PA66, is injected into the injection mold. The injected material is shaped on the injection mold, wherein the electrical conductor elements that is to say the first electrical conductor element and the second electrical conductor elements are overmolded with the plastic material in such a way that radial first electrical connection elements of the electrical conductor elements on a radial outside of the annular carrier element remain free of the overmolding and the electrically conductive sockets are overmolded only on the outer circumference in such a way that a plug opening remains free.

According to the method, provision can be made that the second electrical conductor elements have plug receptacles for the electrically conductive sockets, wherein the electrically conductive sockets are inserted into the plug receptacles of the electrical conductor elements before being placed in the injection mold. Provision can therefore be made for the second electrical conductor elements to be formed in two parts with the electrically conductive sockets. Furthermore, provision can be made that the electrically conductive sockets have a plastic injection molding with the material PA66 before they are assembled with the plug receptacles of the electrical conductor elements, wherein the integration into the annular carrier element then taking place with the overmolding of the electrical conductor elements inserted in the injection mold.

The object of the invention is achieved also by an electric motor for driving a compressor which is formed in a motor vehicle air conditioning system for compressing a gaseous fluid. The electric motor according to the invention has a rotor and a stator, which are disposed to extend along a common longitudinal axis. Another component of the motor according to the invention is an assembly according to any one of the configurations described above for establishing electrical contact with the electric motor. The assembly for establishing electrical contact with the electric motor is disposed on an axial end face of the stator, wherein the stator has electrical connection conductors that are formed as sections of electrical lead wires of coils and which electrical connection conductors are contacted directly with the radial first electrical connection elements of the electrical conductor elements on the axial end face of the stator projecting in axial orientation from the stator in such a way that in each case an axial electrical connection lead corresponds to a first radial electrical connection element, wherein the axial electrical connection conductors of the lead wires with the electrically contacted radial first electrical connection elements are surrounded by a hermetically sealing potting material. In this case, the potting material is preferably introduced only into the cavities or recesses of the annular carrier element. According to the invention, the annular carrier element has at least two, preferably three, axial spacer elements on its side facing the stator, which rest on an axial end face of the stator, wherein the spacer elements are dimensioned in such a way that an air gap is formed between an underside of the carrier element and an axial end face of the stator. This air gap also exists between the underside of the carrier element and the coils and insulator elements of the stator.

A configuration of the electric motor according to the invention is particularly preferred in which an arrangement of the radial first connection elements of the electrical conductor elements that project radially from the annular carrier element corresponds to an arrangement of the radial cut-outs and/or axial openings formed on the underside of the annular carrier element for guiding or feeding through the electrical connection conductors of the lead wires and to an arrangement of the axial electrical connection conductors projecting axially from the end face of the stator. This has the advantage that between the lead wires of the coils of the stator and the radial first electrical connection elements which project radially from the annular carrier element, particularly short electrical line paths can be maintained for the electrical connection, since the axial connection conductors of the lead wires of the coils of the stator projecting axially from the end face of the stator are in direct electrical contact with the radial first electrical connection elements of the electrical conductor elements of the annular carrier.

According to one configuration, the annular carrier element of the assembly for establishing electrical contact with the electric motor can have at least two, preferably three, axial spacer elements on the side facing the stator, which, abutting on the outer circumference of the stator, rest on an axial end face of the stator, wherein a distance is maintained between the underside of the annular carrier element and the stator, in particular insulator elements of coils of the stator.

The axial orientation of the electrically conductive sockets that are overmolded on the outer circumference has proven to be advantageous for receiving the pin-shaped plug elements of an electrical inverter.

The object is furthermore also achieved by a method for assembling an assembly for establishing electrical contact with an electric motor for driving a compressor, which is formed in a vehicle air conditioning system for compressing a gaseous fluid. The method has the following steps of:

- orienting electrical connection conductors of lead wires of coils projecting from the stator of the electric motor on an axial end face of the stator in an axial direction,
- arranging the annular carrier element on the axial end face of the stator, wherein the axial electrical connection conductors are guided along radial cut-outs formed in the annular carrier element or fed through axial openings formed in the annular carrier element in such a way that the electrical connection conductors of the lead wires of coils of the stator are contacted with radial first electrical connection elements of electrical conductor elements radially projecting from the annular carrier element,
- connecting the axial electrical connection conductors to the radial first electrical connection elements, and
- introducing a potting material so that the axial electrical connection conductors and the radial first electrical connection elements that are electrically contacted with and electrically connected to the axial electrical connection conductors are hermetically sealed.

Due to the configuration of the assembly for establishing electrical contact, the axial electrical connection conductors of the lead wires of the stator are guided orthogonally to the radial first electrical connection elements projecting radially from the annular carrier element when the assembly is assembled. In a three-phase stator, three connection conductors of the lead wires and the respective connection ends of the lead wires project axially from the stator. While establishing electrical contact, the axially oriented lead ends of the lead wires are connected to the radial first electrical connection elements of the first electrical conductor element formed as a busbar, wherein electrical contact is established between the axial connection conductors of the lead wires and the radial first electrical connection elements of the second conductor elements. The corresponding arrangement of the axial electrical connection conductors and the radial first connection elements enable particularly simple assembly with a low error potential.

To connect the axial electrical connection conductors to the radial first electrical connection elements, a firmly bonded connection can be provided, for example by joining, specifically welding and/or soldering. However, it is possible to mechanically connect the axial electrical connection conductors and the radial first electrical connection elements by feeding the axial electrical connection conductors through eyelets on the radial first electrical connection conductor and then bending them over in such a way that a permanent connection is ensured. The electrical connections are fixed by introducing the potting material.

The electric motor according to the invention is provided for driving a compressor for compressing a gaseous fluid for a compressor of a refrigerant in a refrigerant circuit of an air conditioning system of a vehicle. In summary, the invention also has the following advantages:

- fully hermetic sealing electrically active connection components exclusively by means of the potting material without additional sealing elements and fixing the wires, in particular the connection conductors, without the need for additional fasteners, as a result of which
- very good electrical insulation and optimal length of the connection conductors of the lead wires as well as minimal cost and minimal weight are achieved,
- in particular complete sealing of the electrical connecting elements, in particular the electrical conductor elements, which are integrated in the annular carrier element and overmolded by the material of the annular carrier element, thereby preventing the ingress of a fluid flowing through the compressor, which avoids the occurrence of short-circuit currents between the connection elements, that is to say between radial first electrical connection elements and the axial electrical connection conductors as well as other electrically conductive, active and inactive components,
- simple assembly, in particular by clear positioning of the annular carrier element with the electrical connecting ports, that is to say first and second electrical connecting elements, due to the clear construction design of the annular carrier element.

BRIEF DESCRIPTION OF DRAWINGS

Further details, features and advantages of configurations of the invention result from the following description of exemplary embodiments with reference to the associated drawings. In the drawings:

FIGS. 3A to 3D: show schematic representations of exemplary embodiments of electrical conductor elements, FIG. 5: shows a schematic representation of the assembly according to the invention, FIG. 6A: shows a schematic representation of the configuration of the assembly according to the invention shown in FIG. 5 in perspective representation from below, FIG. 6B: shows a detail section of the configuration of the assembly according to the invention shown in FIG. 6A, FIG. 7A: shows a schematic representation of a stator of an electric motor according to the invention in perspective representation

DESCRIPTION OF AN EMBODIMENT

Figures 1, 2, 3, 4:
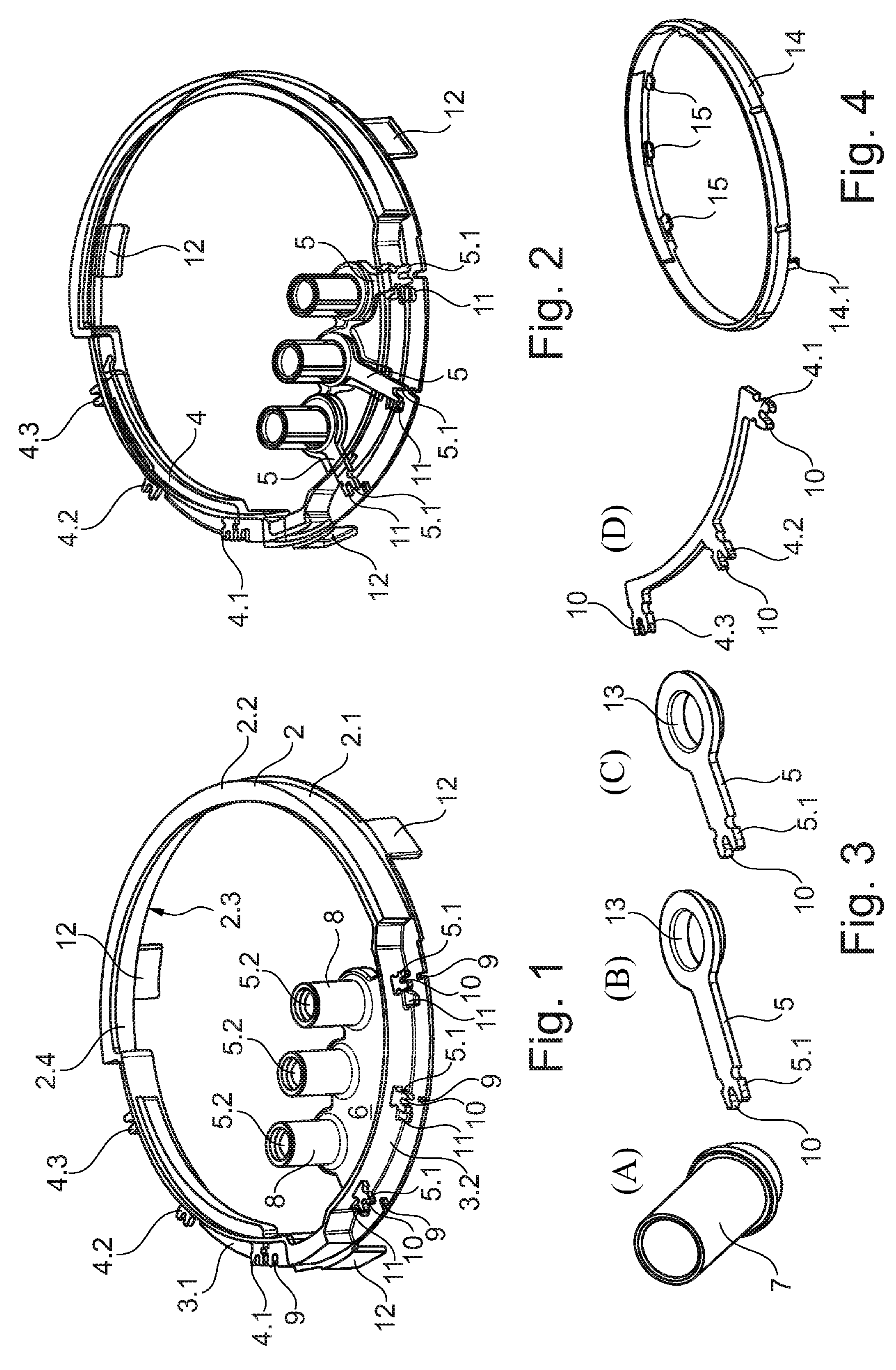
FIG. 1: shows a schematic representation of an exemplary embodiment of a component of an assembly for establishing electrical contact with an electric motor for driving a compressor in perspective view.
FIG. 2: shows the component of the assembly shown in FIG. 1 for establishing electrical contact with an electric motor of a compressor, the component of the assembly being partially transparent.
FIG. 4: shows a schematic representation of an exemplary embodiment of a stop ring of the assembly according to the invention in perspective representation
Figure 7:
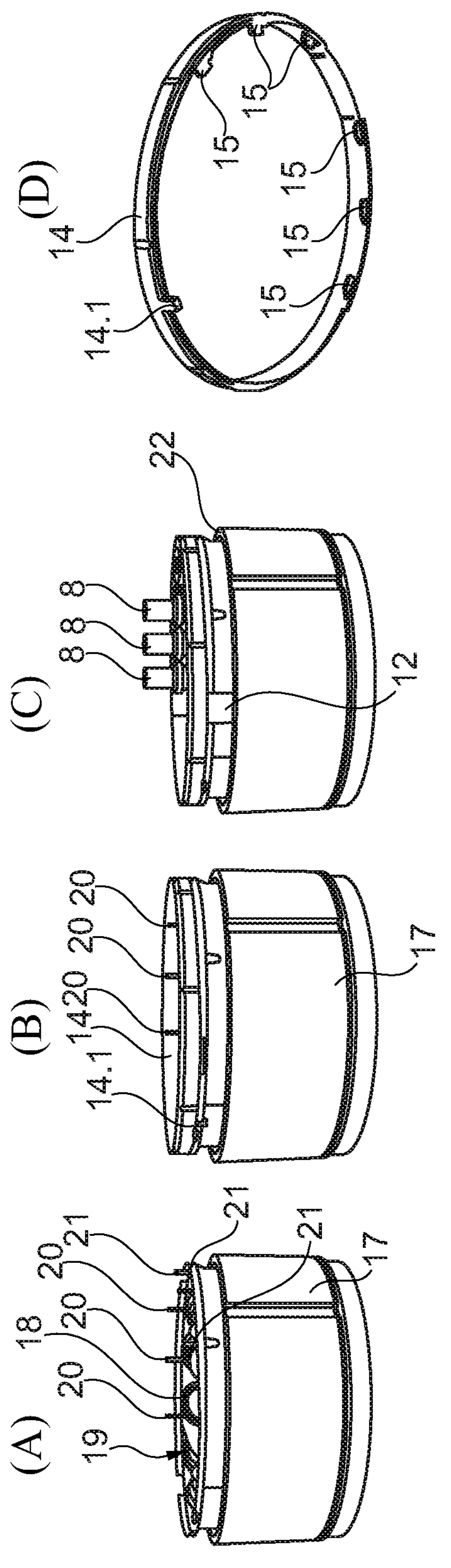
FIG. 7B: shows the stator of an electric motor shown in FIG. 7A with a stop ring.
FIG. 7C: shows the stator shown in FIG. 7B with a stop ring and the assembly according to the invention.
FIG. 7D: shows a stop ring of the assembly according to the invention in isolated perspective representation.

FIG. 1 shows a schematic representation of an exemplary embodiment of a component of an assembly for establishing electrical contact with an electric motor for driving a compressor in perspective view. It shows an injection-molded annular carrier element 2 made of PA66, which is provided for disposal on a stator 17 (see FIG. 7) of an electric motor with reference to one of FIG. 7C or 8A to 8C. The annular carrier element 2 has a radial ring surface 2.1 and an axial ring surface 2.2, which are connected to one another in abutting manner on outer side edges. The radial ring surface 2.1 of the annular carrier element 2 has the shape of a circular ring, wherein the axial ring surface 2.2 of the annular carrier element 2 is in the form of a circular ring cylinder. The radial ring surface 2.1 and the axial ring surface 2.2 are interrupted by recesses 3.1 and 3.2 formed on the outer circumference of the annular carrier element 2. Recesses 3.1 and 3.2, of which a recess 3.1 formed as a first recess and a recess 3.2 formed as a second recess are offset by an angle from the first recess 3.1 are delimited on an underside 2.3 of the annular carrier element 2 facing the stator 17 and radially inwards by the material of the annular carrier element 2. The shape of the recesses 3.1 and 3.2 projects radially inwards beyond a radial inner circumference 2.4 of the annular carrier element 2.

Furthermore, a first electrical conductor element 4, which is formed as an electrical busbar (see FIGS. 2 and 3D), and three second electrical conductor elements 5 (see FIGS. 2, 3B and 3C) that are overmolded by the material of the annular carrier element 2 are integrated in the annular carrier element 2. Due to the overmolding with the material of the annular carrier element 2, the electrical conductor elements 4 and 5 are covered in the representation of the annular carrier element 2 shown in FIG. 1. An arrangement of the electrical conductor elements 4 and 5 within the annular carrier element 2 can be seen in FIG. 2, which shows the annular carrier element 2 in a semi-transparent representation. The first conductor element 4 formed as a busbar is associated with the first recess 3.1 and has three radial first electrical connection elements 4.1, 4.2 and 4.3, which project radially outwards into the first recess 3.1 without projecting beyond the outer circumference of the annular carrier element 2. The radial first electrical connection elements 4.1, 4.2 and 4.3 of the first electrical conductor element 4 are used for establishing electrical contact with axial electrical connection conductors 21 of lead wires from coils 18 of the stator 17 (see FIG. 7A) projecting from the stator 17 on an axial end face 19. The three second electrical conductor elements 5 are electrically insulated from one another and associated with the second recess 3.2, wherein each second electrical conductor element 5 has a radial first electrical connection element 5.1 and an axial second electrical connection element 5.2. The radial first electrical connection elements 5.1 of the second electrical conductor elements 5 are formed to project radially outwards into the second recess 3.2, without projecting beyond the outer circumference of the annular carrier element 2. The radial first electrical connection elements 5.1 of the second electrical conductor element 5 are used for establishing electrical contact with axial electrical connection conductors 20 (see FIG. 7A) of lead wires of coils 18 of the stator 17 projecting from a stator 17 on an axial end face 19.

On the underside 2.3 of the annular carrier element 2 facing the stator 17, radial cut-outs 9 are formed in the area of the recesses 3.1 and 3.2, which are used to guide and position axial connection conductors 20 and axial connection conductors 21 of lead wires of coils 18 of the stator 17 with which electrical contact is to be established, projecting axially from an end face 19. The positions of the radial cut-outs 9 on the circumference of the annular carrier element 2 each correspond axially to the radial first connection elements 4.1, 4.2 and 4.3 of the first electrical conductor element 4 and to the radial first connection elements 5.1 of the second electrical conductor elements 5. In this case, the radial first electrical connection elements 4.1, 4.2, 4.3 and 5.1 each have half-open eyelets 10 for receiving axial electrical connection conductors 20 of the lead wires of coils 18 of the stator 17, wherein the half-open eyelets 10 each being oriented radially towards a radial cut-out 9. The radial cut-out 9 and the half-open eyelets 10 are thus oriented radially and axially towards one another, so that axial electrical connection conductors 20 and axial electrical connection conductors 21 of the lead wires of coils 18 of the stator 17 which are guided from the underside 2.3 through the radial cut-outs 9 into the recesses 3.1 and 3.2, get directly to the associated radial first electrical connection elements 4.1, 4.2, 4.3 and 5.1 in each case.

To further stabilize the guiding of axial electrical connection conductors 20 and axial electrical connection conductors 21 of the lead wires of coils 18 of stator 17, guide elements 11 are disposed in recesses 3.1 and 3.2, which are formed projecting from the radially indented recess walls, from which the radial first electrical connection elements 4.1, 4.2, 4.3 and 5.1 project, pointing radially outwards. A guide element 11 is associated with each radial first electrical connection element 4.1, 4.2, 4.3 and 5.1, wherein the guide elements 11 are disposed at an angle with respect to the radial first electrical connection elements 4.1, 4.2, 4.3 and 5.1. In this case, each guide element 11 has an inclined side which faces a radial cut-out 9. The guide elements 11 are provided in order to axially support the axial electrical connection conductors 20 introduced through the radial cut-outs 9 and the axial electrical connection conductors 21 of the lead wires of coils 18 of the stator 17 in order to ensure them being received in the half-open eyelets 10 of the first radial electrical connection elements 4.1, 4.2, 4.3 and 5.1.

The second electrical conductor elements 5 overmolded by the material of the annular carrier element 2 extend radially inwards from the exposed radial first electrical connection elements 5.1, wherein the overmolding of the second electrical conductor elements 5 forms a radial projection 6 extending radially inwards. The axial second electrical connection elements 5.2 in the form of electrically conductive sockets 7 (see FIG. 3A) open on one side and overmolded by the material of the annular carrier element 2 on the outer circumference extend in an axial direction away from the stator from the radial projection 6. The outer circumferential overmolding of the electrically conductive sockets 7 forms cylindrical plug receptacles 8 for plugging in pin-shaped plug elements of an electrical inverter. The three cylindrical plug receptacles 8 are disposed on a line evenly spaced. As a result, the central second electrical conductor element 5 is formed radially longer than the two outer second electrical conductor elements 5.

On the outer radial circumference of the annular carrier element 2, three spacer elements 12 extend in an axial direction facing the stator 17. The spacer elements 12 are provided in order to ensure a distance between the underside 2.3 of the annular carrier element 2 and the stator 17, in particular coils 18 or overmoldings of coils of the stator 17. The air gap also exists between the stator teeth and the annular carrier element 2.

FIG. 2 shows the annular carrier element 2 shown in FIG. 1 of an assembly 1 (see FIG. 5) for establishing electrical contact with an electric motor of a compressor, wherein the annular carrier element 2 is shown partially transparent. The arrangement of the first electrical conductor element 4 formed as a busbar can be seen, the radial first electrical connection elements 4.1, 4.2 and 4.3 of which project radially outwards from the annular carrier element 2 in the area of the first recess 3.1. Further, it shows the arrangement of the second electrical conductor elements 5, the radial first electrical connection elements 5.1 of which project radially outwards from the annular carrier element 2 in the area of the second recess 3.2. The second electrical conductor elements 5 extend radially inwards into the radial projection 6. The second electrical connection elements 5.2 are formed with electrically conductive sockets 7, which are inserted perpendicularly into the second electrical conductor elements 5 and, overmolded by the material of the annular carrier element 2, project beyond the axial ring surface 2.2. In this case, the electrically conductive sockets 7 are open at the top in order to enable pin-shaped plug elements of an electrical inverter to be inserted.

FIGS. 3A to 3D show schematic representations of exemplary embodiments of electrical conductor elements 4 and 5 of the assembly 1 according to the invention, without overmolding. To produce the annular carrier element 2, the electrical conductor elements 4 and 5 are placed in an injection mold that defines the shape of the annular carrier element 2. The injection mold is then filled with a plastic material, wherein the electrical conductor elements 4 and 5 are overmolded by the plastic material.

FIG. 3A shows a schematic representation of an exemplary embodiment of an electrically conductive socket 7 in perspective representation. The socket 7 can be formed as a single part and can be connected with the second electrical conductor elements 5 during the production of the annular carrier element 2. As can be seen from FIGS. 3B and 3C, the second electrical conductor elements 5 have plug receptacles 13, into which the electrically conductive sockets 7 are inserted to complete the electrical contacting, before the electrically conductive component that is formed in each case from an electrically conductive socket 7 and a second electrical conductor element 5, is placed in an injection mold.

FIG. 3B shows a schematic representation of an exemplary embodiment of the central second electrical conductor element 5, which is longer than the second electrical conductor element 5 shown in FIG. 3C, and which is one of the two outer second electrical conductor elements 5. The different lengths of the second electrical conductor elements 5 allow the electrically conductive sockets 7 to be disposed in a line, that is to say along a secant intersecting the annular carrier element 2, while the radial first electrical connection elements 5.1 projecting radially from the material of the annular carrier element 2 are disposed along a circular ring section within the second recess 3.2.

FIG. 3D shows a schematic representation of an exemplary embodiment of the first electrical conductor element 4 in the form of an electrical busbar in perspective representation. The first electrical conductor element 4 has a radius, with the radial first electrical connection elements 4.1, 4.2 and 4.3 being disposed at equal distances along the busbar, which is formed as a circular ring section.

FIG. 4 shows a schematic representation of an exemplary embodiment of a stop ring 14, which can be disposed on the outer radial circumference of the annular carrier element 2 on the radial ring surface 2.1 in order to delimit radially outwards the radial ring surface 2.1 in the areas of the recesses 3.1 and 3.2, in which the radial ring surface 2.1 is interrupted. On its inner circumference, the stop ring 14 has shutters 15 pointing radially inwards, which correspond to the radial recesses 9 on the annular carrier element 2 in each case when the stop ring 14 is disposed on the circumference of the annular carrier element 2. The stop ring 14 is formed to be rotatable with the annular carrier element 2 so that the positioning of the radially inwards pointing shutters 15 can be adjusted with respect to the radial cut-outs 9 in order to achieve covering of the radial recesses 9. The shutters 15 pointing radially inwards are provided in order to reduce the opening cross section of the radial cut-outs 9 as much as possible when the axial connection conductors 20 and the axial connection conductors 21 of the lead wires of coils 18 of the stator 17 are received in the radial cut-outs 9. By delimiting the opening cross-section of the radial cut-outs 9 receiving the connection conductors 20 of the lead wires of coils 18 of the stator 17, the risk of potting material escaping or flowing out on the underside 2.3 of the annular carrier element 2 can be reduced. On its axial end face facing the stator 17, the stop ring 14 has a latching element 14.1, which is formed in the form of a hook. The hook snaps into place on the circumference of the stator 17, fixing the stop ring 14 in place.

FIG. 5 shows a schematic representation of the assembly 1 according to the invention. The annular carrier element 2 shown in FIG. 1 is shown together with the stop ring 14 shown in FIG. 4. Here, the stop ring 14 is disposed on the outer circumference of the annular carrier element 2, that is to say on the radial ring surface 2.1. The stop ring 14 is provided to delimit and seal the recesses 3.1 and 3.2 radially outwards in such a way that the annular carrier element 2 has cavities open to an upper side of the annular carrier element 2 on its axial ring surface 2.2 (see FIG. 1), which can be filled with potting material.

FIG. 6A shows a schematic representation of the configuration of the assembly 1 according to the invention shown in FIG. 5 in perspective representation from below, that is to say with a view of the underside 2.3 of the annular carrier element 2. On the underside of the radial projection 6 axially projecting supporting elements 16 are formed in the area of the overmoldings of the electrically conductive sockets 7. The supporting elements 16 are moldings whose arrangement corresponds to stator teeth formed axially on the end face of the stator 17 in order to support axial compressive stress on the radial projection 6.

FIG. 6B shows a detail section of the configuration of the assembly 1 according to the invention shown in FIG. 6A. It shows the area of the radial projection 6 from its underside, on which the supporting elements 16 are formed. The cross section of the supporting elements 16 is T-shaped in the axial orientation of the annular carrier element 2.

FIG. 7A shows a schematic representation of a stator arrangement of an electric motor according to the invention in perspective representation. The stator 17 comprises a stator core with stator teeth pointing radially inwards, on which coils 18 are disposed. The stator 17 has an axial end face 19 on which the axial electrical connection conductors 20 and the axial electrical connection conductors 21 of the lead wires of the coils 18 of the stator 17 project axially.

FIG. 7B shows the stator 17 shown in FIG. 7A of an electric motor with a stop ring 14. In this case, the stop ring 14 is disposed on the axial end face 19 of the stator 17 in such a way that the axial electrical connection conductors 20 and the axial electrical connection conductors 21 of the lead wires of the coils 18 of the stator 17 do not project beyond the stop ring 14 axially. The axial electrical connection conductors 20 and the axial electrical connection conductors 21 of the lead wires of the coils 18 of the stator 17 can be shortened correspondingly in order to facilitate assembly of the assembly 1 for establishing electrical contact. The shortening of the axial electrical connection conductors 20 and the axial electrical connection conductors 21 of the lead wires of the coils 18 of the stator 17 can be provided as a method step. The hook-shaped latching element 14.1 is latched or hooked onto a collar of the stator 17 formed on the outer circumference.

FIG. 7C shows the stator 17 shown in FIG. 7B with the stop ring 14 and the annular carrier element 2 of the assembly 1 according to the invention. The representation shows the final composition of the assembly 1 on the stator 17. In this case, there is established electrical contact between the radial first electrical connection elements 4.1, 4.2, 4.3 of the first electrical conductor element 4 and the axial electrical connection conductors 21 of the lead wires of the coils 18 of the stator 17, wherein the radial first electrical connection elements 5.1 of the second electrical conductor elements 5 establish electrical contact with the axial electrical connection conductors 20 of the lead wires of the coils 18 of the stator 17. The cylindrical plug receptacles 8 of the annular carrier element 2 project axially beyond the arrangement. The axial spacer elements 12 formed on the annular carrier element 2 on the side facing the stator 17 rest on an axial end face 22 of the stator 17. The axial end face 22 of the stator 17 forms a shoulder on which the spacer elements 12 rest and support the annular carrier element 2. In this case, the spacer elements 12 are dimensioned in such a way that an air gap is formed between an underside 2.3 of the annular carrier element 2 and an axial end face of the stator 17. Here, the air gap is also formed between an underside 2.3 of the annular carrier element 2 and the coils 18 and insulator elements of the stator 17.

FIG. 7D shows the stop ring 14 of the assembly 1 according to the invention in isolated perspective representation from an underside which faces the stator 17. The stop ring 14 has six shutters 15, which are formed pointing radially inwards. The latching element 14.1 projects axially on the underside. The stop ring is preferably formed as an injection molded part.

Figure 8:
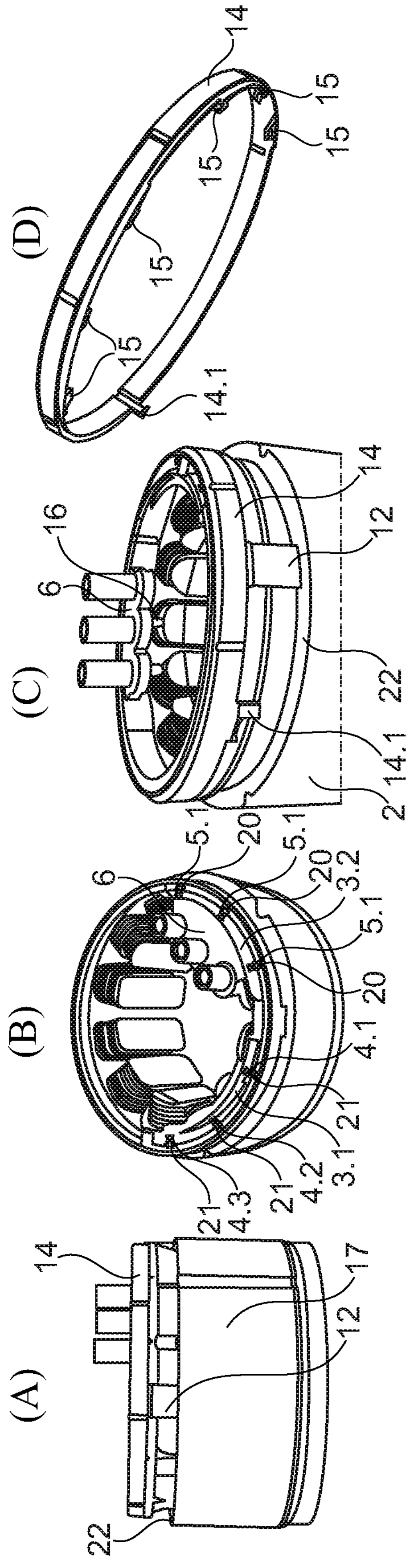
FIG. 8A: shows a stator of the electric motor according to the invention with the assembly according to the invention for establishing electrical contact with the electric motor as in FIG. 7C, FIG. 8B: shows the stator of the electric motor according to the invention with the assembly according to the invention as in FIG. 8A in a different perspective view.
FIG. 8C: shows a detail section of the configuration of the stator of the electric motor according to the invention shown in FIG. 8B with the assembly according to the invention in a further perspective representation.
FIG. 8D: shows the stop ring of the assembly according to the invention as in FIG. 7D, in a different perspective representation.

FIG. 8A shows the stator 17 from FIG. 7C from a different angle. One of three spacer elements 12 of the annular carrier element 2 can be seen in the foreground. The spacer elements 12 support the annular carrier element 2 on the axial end face 22 in such a way that the underside 2.3 of the annular carrier element 2 has no contact with coils 18, insulator elements or insulating overmoldings of the stator 17. Because the spacer elements 12 are supported on the axial end face 22, a distance in the form of an air gap is formed between the surface of the underside 2.3 of the annular carrier element 2 and the outer axial end face of the stator 17.

FIG. 8B shows the stator 17 shown in FIG. 8A with the stop ring 14 and the annular carrier element 2 of the assembly 1 according to the invention. The representation also shows the final composition of the assembly 1 on the stator 17, without potting material. In this case, the radial first electrical connection elements 4.1, 4.2, 4.3 of the first electrical conductor element 4 establish electrical contact with the axial electrical connection conductors 21 of the lead wires of the coils 18 of the stator 17, wherein the radial first electrical connection elements 5.1 of the second electrical conductor elements 5 establish electrical contact with the axial electrical connection conductors 20 of the wires of the coils 18 of the stator 17. The arrangement of the stop ring 14 delimits the first recess 3.1 and the second recess 3.2 radially outwards, as a result of which cavities open at the top are formed, which can be filled with potting material.

FIG. 8C shows a detail section of the configuration shown in FIG. 8B of the stator 17 of the electric motor according to the invention with the assembly 1 according to the invention in a further perspective representation. It shows the supporting elements 16, each of which is axially opposite a radial end of a stator tooth of the stator 17. The supporting elements 16 support the radial projection 6 of the annular carrier element 2 axially with respect to the stator teeth.

FIG. 8D shows the stop ring 14 of the assembly 1 according to the invention as in FIG. 7D in a different perspective representation.

LIST OF REFERENCE NUMERALS

1 assembly
2 annular carrier element

2.1 radial ring surface
2.2 axial ring surface
2.3 underside
2.4 radial inner circumference
3.1 first recess
3.2 second recess
4 first electrical conductor element
4.1-4.3 radial first electrical connection elements
5 second electrical conductor element
5.1 radial first electrical connection elements
5.2 axial second electrical connection element
6 radial projection
7 electrically conductive socket
8 cylindrical plug receptacle
9 radial cut-out
10 eyelet
11 guide elements
12 spacer
13 plug receptacle
14 stop ring
14.1 latching element
15 shutters
16 supporting elements
17 stator
18 coils
19 axial end face
20 axial electrical connection conductors
21 axial electrical connection conductors
22 axial end face of the stator 17

What is claimed is:

1. An assembly for establishing electrical contact with an electric motor for driving a compressor which is formed in a motor vehicle air conditioning system for compressing a gaseous fluid, the assembly comprising:

electrical conductor elements for electrical connection of axial electrical connection conductors of lead wires of coils of a stator projecting on a first axial end face from the stator of the electric motor, and an injection-molded annular carrier element, in which the electrical conductor elements, overmolded by a material of the annular carrier element, are incorporated, wherein radial first electrical connection elements of the electrical conductor elements projecting in a radial direction from the annular carrier element are formed for establishing electrical contact with the axial electrical connection conductors of the lead wires of the coils of the stator, wherein a first one of the electrical conductor elements is formed as an electrical busbar, and wherein a plurality of second ones of the electrical conductor elements have, electrically separated from one another, second electrical connection elements in the form of electrically conductive sockets, which, open on one side for plugging in a pin-shaped plug element and overmolded by the material of the annular carrier element on an outer circumference, are incorporated in the annular carrier element, wherein the annular carrier element has radial cavities, axial cavities and/or cavities in a form of recesses on the outer circumference, wherein the radial first electrical connection elements are disposed in the cavities and/or the recesses, and wherein in areas of the annular carrier element in which the radial cavities, the axial cavities and/or the cavities in the form of recesses are formed, guides or feed-throughs are formed in the form of radial cut-outs and/or axial openings for the axial electrical connection conductors of the lead wires of the coils of the stator.

2. The assembly according to claim 1, wherein a stop ring for a radially outer circumferential boundary of the recesses of the annular carrier element is disposed on a radial circumference of the annular carrier element, wherein the stop ring has at least one latching element in order to fix a position on the annular carrier element.

3. The assembly according to claim 2, wherein radial shutters are formed on the stop ring, which correspond to the radial cut-outs and/or the axial openings formed on the annular carrier element in such a way that the radial cut-outs and/or the axial openings formed on the annular carrier element can be covered at least area by area when the stop ring is positioned on the annular carrier element.

4. The assembly according to claim 1, wherein the radial first electrical connection elements have open or closed eyelets for receiving the axial electrical connection conductors of the lead wires of the coils of the stator.

5. The assembly according to claim 1, wherein a radially inwardly extending projection is formed on the annular carrier element, from which the second electrical connection elements of the second ones of the electrical conductor elements are received in the form of electrically conductive sockets overmolded on an outer circumference, wherein the electrically conductive sockets that are overmolded on the outer circumference extend in an axial direction out of the projection on an upper side facing away from the stator.

6. The assembly according to claim 5, wherein the electrically conductive sockets that are overmolded on the outer circumference form a cylindrical plug receptacle for a plug element.

7. The assembly according to claim 1, wherein the annular carrier element on a side facing the stator has at least two axial spacer elements, which rest on a second axial end face of the stator when the assembly is positioned on the stator.

8. The assembly according to claim 7, wherein the spacer elements are dimensioned in such a way that an air gap is formed between an underside of the annular carrier element and the second axial end face of the stator.

9. An assembly for establishing electrical contact with an electric motor for driving a compressor which is formed in a motor vehicle air conditioning system for compressing a gaseous fluid, the assembly comprising:

electrical conductor elements for electrical connection of axial electrical connection conductors of lead wires of coils of a stator projecting on a first axial end face from the stator of the electric motor, and an injection-molded annular carrier element, in which the electrical conductor elements, overmolded by a material of the annular carrier element, are incorporated, wherein radial first electrical connection elements of the electrical conductor elements projecting in a radial direction from the annular carrier element are formed for establishing electrical contact with the axial electrical connection conductors of the lead wires of the coils of the stator, wherein a first one of the electrical conductor elements is formed as an electrical busbar, and wherein a plurality of second ones of the electrical conductor elements have, electrically separated from one another, second electrical connection elements in the form of electrically conductive sockets, which, open on one side for plugging in a pin-shaped plug element and overmolded by the material of the annular carrier element on an outer circumference, are incorporated in the annular carrier element, wherein the annular carrier element has radial cavities, axial cavities and/or cavities in a form of recesses on the outer circumference, wherein the radial first electrical connection elements are disposed in the cavities and/or the recesses, wherein guide elements for the axial electrical connection conductors of the coils of the stator are disposed in the recesses, wherein the guide elements are formed from radially indented recess walls pointing radially outwards, the guide elements being disposed at an angle with respect to the radial first electrical connection elements.

10. An assembly for establishing electrical contact with an electric motor for driving a compressor which is formed in a motor vehicle air conditioning system for compressing a gaseous fluid, the assembly comprising:

electrical conductor elements for electrical connection of axial electrical connection conductors of lead wires of coils of a stator projecting on a first axial end face from the stator of the electric motor, and an injection-molded annular carrier element, in which the electrical conductor elements, overmolded by a material of the annular carrier element, are incorporated, wherein radial first electrical connection elements of the electrical conductor elements projecting in a radial direction from the annular carrier element are formed for establishing electrical contact with the axial electrical connection conductors of the lead wires of the coils of the stator, wherein a first one of the electrical conductor elements is formed as an electrical busbar, wherein a plurality of second ones of the electrical conductor elements have, electrically separated from one another, second electrical connection elements in the form of electrically conductive sockets, which, open on one side for plugging in a pin-shaped plug element and overmolded by the material of the annular carrier element on an outer circumference, are incorporated in the annular carrier element, wherein a radially inwardly extending projection is formed on the annular carrier element, from which the second electrical connection elements of the second ones of the electrical conductor elements are received in the form of electrically conductive sockets overmolded on an outer circumference, wherein the electrically conductive sockets that are overmolded on the outer circumference extend in an axial direction out of the projection on an upper side facing away from the stator, wherein the electrically conductive sockets that are overmolded on the outer circumference form a cylindrical plug receptacle for a plug element, and wherein the electrically conductive sockets that are overmolded on the outer circumference are uniformly spaced apart on a secant intersecting the annular carrier element.

11. An assembly for establishing electrical contact with an electric motor for driving a compressor which is formed in a motor vehicle air conditioning system for compressing a gaseous fluid, the assembly comprising:

electrical conductor elements for electrical connection of axial electrical connection conductors of lead wires of coils of a stator projecting on a first axial end face from the stator of the electric motor, and an injection-molded annular carrier element, in which the electrical conductor elements, overmolded by a material of the annular carrier element, are incorporated, wherein radial first electrical connection elements of the electrical conductor elements projecting in a radial direction from the annular carrier element are formed for establishing electrical contact with the axial electrical connection conductors of the lead wires of the coils of the stator, wherein a first one of the electrical conductor elements is formed as an electrical busbar, wherein a plurality of second ones of the electrical conductor elements have, electrically separated from one another, second electrical connection elements in the form of electrically conductive sockets, which, open on one side for plugging in a pin-shaped plug element and overmolded by the material of the annular carrier element on an outer circumference, are incorporated in the annular carrier element, wherein a radially inwardly extending projection is formed on the annular carrier element, from which the second electrical connection elements of the second ones of the electrical conductor elements are received in the form of electrically conductive sockets overmolded on an outer circumference, wherein the electrically conductive sockets that are overmolded on the outer circumference extend in an axial direction out of the projection on an upper side facing away from the stator, wherein the electrically conductive sockets that are overmolded on the outer circumference form a cylindrical plug receptacle for a plug element, and wherein on an underside of the annular carrier element facing axially projecting supporting elements of the stator are formed in an area of the projection.

12. A method for producing an assembly for establishing electrical contact with an electric motor for driving a compressor which is formed in a motor vehicle air conditioning system for compressing a gaseous fluid, the assembly comprising:

electrical conductor elements for electrical connection of axial electrical connection conductors of lead wires of coils of a stator projecting on a first axial end face from the stator of the electric motor, and an injection-molded annular carrier element, in which the electrical conductor elements, overmolded by a material of the annular carrier element, are incorporated, wherein radial first electrical connection elements of the electrical conductor elements projecting in a radial direction from the annular carrier element are formed for establishing electrical contact with the axial electrical connection conductors of the lead wires of the coils of the stator, wherein a first one of the electrical conductor elements is formed as an electrical busbar, wherein a plurality of second ones of the electrical conductor elements have, electrically separated from one another, second electrical connection elements in the form of electrically conductive sockets, which, open on one side for plugging in a pin-shaped plug element and overmolded by the material of the annular carrier element on an outer circumference, are incorporated in the annular carrier element, wherein the first one of the electrical conductor elements and the plurality of second ones of the electrical conductor elements, and electrically conductive sockets are placed in an injection mold that defines a shape of the annular carrier element and then a plastic material is injected into the injection mold, which is shaped on the injection mold and thereby the electrical conductor elements are overmolded with the plastic material in such a way that the radial first electrical connection elements of the electrical conductor elements on a radial outside of the annular carrier element remain free of overmolding and the electrically conductive sockets are overmolded on the outer circumference in such a way that a plug opening remains free, wherein the second ones of the electrical conducting elements have plug receptacles for the electrically conductive sockets, wherein, before being inserted into the injection mold, the electrically conductive sockets are plugged in the plug receptacles of the second ones of the electrical conductor elements.

13. An electric motor for driving a compressor, which is formed in a motor vehicle air conditioning system for compressing a gaseous fluid, the electric motor having a rotor and a stator, which are disposed to extend along a common longitudinal axis, and an assembly for establishing electrical contact with the electric motor for driving the compressor, which is disposed on the first axial end face of the stator for establishing the electrical contact with the electric motor, the assembly comprising:

electrical conductor elements for electrical connection of axial electrical connection conductors of lead wires of coils of a stator projecting on a first axial end face from the stator of the electric motor, and an injection-molded annular carrier element, in which the electrical conductor elements, overmolded by a material of the annular carrier element, are incorporated, wherein radial first electrical connection elements of the electrical conductor elements projecting in a radial direction from the annular carrier element are formed for establishing electrical contact with the axial electrical connection conductors of the lead wires of the coils of the stator, wherein a first one of the electrical conductor elements is formed as an electrical busbar and, wherein a plurality of second ones of the electrical conductor elements have, electrically separated from one another, second electrical connection elements in the form of electrically conductive sockets, which, open on one side for plugging in a pin-shaped plug element and overmolded by the material of the annular carrier element on an outer circumference, are incorporated in the annular carrier element, wherein the annular carrier element has radial cavities, axial cavities and/or cavities in a form of recesses on the outer circumference, wherein the radial first electrical connection elements are disposed in the cavities and/or the recesses, and wherein in areas of the annular carrier element in which the radial cavities, the axial cavities and/or the cavities in the form of recesses are formed, guides or feed-throughs are formed in the form of radial cut-outs and/or axial openings for the axial electrical connection conductors of the lead wires of the coils of the stator, the stator having the electrical connection conductors that are formed as sections of the electrical lead wires of the coils and wherein the electrical connection conductors are contacted directly with the radial first electrical connection elements of the electrical conductor elements on the first axial end face of the stator projecting in axial orientation from the stator in such a way that in each case one of the axial electrical connection conductors corresponds to the radial first electrical connection elements, wherein the axial electrical connection conductors of the lead wires of the coils with the electrically contacted radial first electrical connection elements are surrounded by a hermetically sealing potting material.

14. The electric motor according to claim 13, wherein axial spacer elements, abutting on an outer circumference of the stator, rest on the second axial end face of the stator, and wherein a distance is maintained between the underside of the annular carrier element and the stator.

15. Use of the electric motor for driving the compressor for compressing the gaseous fluid according to claim 13 in a refrigerant circuit of the vehicle air conditioning system.

16. A method for assembling the assembly for establishing electrical contact with an electric motor for driving a compressor, which is formed in a vehicle air conditioning system for compressing a gaseous fluid, the assembly comprising:

electrical conductor elements for electrical connection of axial electrical connection conductors of lead wires of coils of a stator projecting on a first axial end face from the stator of the electric motor, and an injection-molded annular carrier element, in which the electrical conductor elements, overmolded by a material of the annular carrier element, are incorporated, wherein radial first electrical connection elements of the electrical conductor elements projecting in a radial direction from the annular carrier element are formed for establishing electrical contact with the axial electrical connection conductors of the lead wires of the coils of the stator, wherein a first one of the electrical conductor elements is formed as an electrical busbar and, wherein a plurality of second ones of the electrical conductor elements have, electrically separated from one another, second electrical connection elements in the form of electrically conductive sockets, which, open on one side for plugging in a pin-shaped plug element and overmolded by the material of the annular carrier element on an outer circumference, are incorporated in the annular carrier element, the method comprising the steps of:

orienting the electrical connection conductors of the lead wires of the coils projecting from the stator of the electric motor on the first axial end face of the stator in an axial direction, arranging the annular carrier element on the first axial end face of the stator, wherein the axial electrical connection conductors are guided along radial cut-outs formed in the annular carrier element or fed through axial openings formed in the annular carrier element in such a way that the electrical connection conductors of the lead wires of the coils are contacted with the radial first electrical connection elements of the electrical conductor elements radially projecting from the annular carrier element, connecting the axial electrical connection conductors to the radial first electrical connection elements, and introducing a potting material so that the axial electrical connection conductors and the radial first electrical connection elements that are electrically contacted with and electrically connected to the axial electrical connection conductors are hermetically sealed.

17. The method according to claim 16, wherein the connection between the axial electrical connection conductors and the radial first electrical connection elements is provided in a firmly bonded or mechanical manner.

* * * * *